United States Patent
Mahoney et al.

(10) Patent No.: US 11,421,670 B2
(45) Date of Patent: Aug. 23, 2022

(54) CRYOPUMP WITH ENHANCED FRONTAL ARRAY

(71) Applicant: Edwards Vacuum LLC, Sanborn, NY (US)

(72) Inventors: Paul K. Mahoney, Attleboro, MA (US); John J. Casello, Norton, MA (US)

(73) Assignee: Edwards Vacuum LLC, Sanborn, NY (US)

(*) Notice: Subject to any disclaimer, the term of this patent is extended or adjusted under 35 U.S.C. 154(b) by 158 days.

(21) Appl. No.: 16/764,567

(22) PCT Filed: Nov. 15, 2018

(86) PCT No.: PCT/US2018/061367
§ 371 (c)(1),
(2) Date: May 15, 2020

(87) PCT Pub. No.: WO2019/099728
PCT Pub. Date: May 23, 2019

(65) Prior Publication Data
US 2020/0392950 A1 Dec. 17, 2020

Related U.S. Application Data

(60) Provisional application No. 62/588,209, filed on Nov. 17, 2017.

(51) Int. Cl.
*F04B 37/08* (2006.01)
*B01D 8/00* (2006.01)
(Continued)

(52) U.S. Cl.
CPC .............. *F04B 37/085* (2013.01); *B01D 8/00* (2013.01); *F04B 37/02* (2013.01); *F04B 37/08* (2013.01);
(Continued)

(58) Field of Classification Search
CPC ........ F04B 37/08; F04B 37/02; F04B 37/085; F25B 9/10; F17C 2227/0353; B01D 8/00
See application file for complete search history.

(56) References Cited

U.S. PATENT DOCUMENTS 4,311,018 A 1/1982 Welch
4,356,701 A 11/1982 Bartlett et al.
(Continued)

FOREIGN PATENT DOCUMENTS

CN 85200140 U 9/1985
JP S6088881 A 5/1985
(Continued)

OTHER PUBLICATIONS

PCT Written Opinion of the International Search Authority dated Jan. 31, 2019 for corresponding PCT Application No. PCT/US2018/061367.
(Continued)

*Primary Examiner* — Lionel Nouketcha
(74) *Attorney, Agent, or Firm* — Theodore M. Magee; Westman, Champlin & Koehler, P.A.

(57) ABSTRACT

A cryopump has a cryogenic refrigerator with cold and colder stages that cool a radiation shield, a primary cryopumping array and a frontal array. The frontal array is coupled to the cold stage and is spaced from and wrapped around the frontally facing envelope of the primary cryopumping array. The frontal array may be recessed from the frontal opening and closer to the primary cryopumping array than to the frontal opening.

17 Claims, 11 Drawing Sheets

(51) Int. Cl.
    *F25B 9/10*         (2006.01)
    *F04B 37/02*      (2006.01)
    *F04B 37/16*      (2006.01)

(52) U.S. Cl.
    CPC ....... *F04B 37/16* (2013.01); *F17C 2227/0353* (2013.01); *F25B 9/10* (2013.01)

(56) References Cited

U.S. PATENT DOCUMENTS

| | | |
|---|---|---|
| 4,494,381 A | 1/1985 | Lessard |
| 4,577,465 A | 3/1986 | Olsen |
| 4,791,791 A | 12/1988 | Flegal et al. |
| 5,211,022 A | 5/1993 | Bartlett |
| 7,313,922 B2 | 1/2008 | Bartlett et al. |
| 2006/0064990 A1 | 3/2006 | Bartlett |
| 2015/0107273 A1 | 4/2015 | Babu |

FOREIGN PATENT DOCUMENTS

| | | |
|---|---|---|
| JP | S614072 Y2 | 2/1986 |
| JP | H02308985 A | 12/1990 |
| TW | 200905076 A | 2/2009 |
| TW | 201930722 A | 8/2019 |
| WO | 2019099862 A1 | 5/2019 |

OTHER PUBLICATIONS

PCT Search Report dated Jan. 31, 2019 for corresponding PCT Application No. PCT/US2018/061367.

PCT Written Opinion of the International Search Authority dated Mar. 7, 2019 for corresponding PCT Application No. PCT/US2018/061566.

PCT Search Report dated Mar. 7, 2019 for corresponding PCT Application No. PCT/US2018/061566.

Chinese First Office Action dated Aug. 3, 2021 and Search Report dated Jul. 26, 2021 for corresponding Chinese application Serial No. 201880074264.8, 15 pages.

Taiwanese Office Action dated Mar. 3, 2022 for corresponding Taiwanese application No. 107140809, 6 pages.

CRYOPUMP WITH ENHANCED FRONTAL ARRAY

CROSS-REFERENCE TO RELATED APPLICATIONS

This application is a Section 371 National Stage Application of International Application No. PCT/US2018/061367, filed Nov. 15, 2018, and published as WO 2019/099728 A1 on May 23, 2019, the content of which is hereby incorporated by reference in its entirety and which claims priority of U.S. Provisional Application No. 62/588,209, filed on Nov. 17, 2017. The entire teachings of the above application are incorporated herein by reference.

BACKGROUND

Cryopumps currently available, whether cooled by open or closed cryogenic cycles, generally follow the same design concept. A low temperature second stage array, usually operating in the range of 4-25 K, is a primary pumping surface. This surface is surrounded by a high temperature cylinder usually operated in the temperature range of 65-130 K, which provides radiation shielding to the lower temperature array. The radiation shield generally comprises a housing which is closed except at a frontal array positioned between the primary pumping surface and the chamber to be evacuated. This higher temperature, first stage, frontal array serves as a pumping site for high boiling point gases such as water vapor, known as Type I gases.

In operation, high boiling point gases such as water vapor are condensed on the cold frontal array. Lower boiling point gases pass through the frontal array and into the volume within the radiation shield. Type II gases, such as nitrogen, condense on the colder second stage array. Type III gases, such as hydrogen, helium and neon, have appreciable vapor pressures at 4K. To capture Type III gases, inner surfaces of the second stage array may be coated with an adsorbent such as charcoal, zeolite or a molecular sieve. Adsorption is a process whereby gases are physically captured by a material held at cryogenic temperatures and thereby removed from the environment. With the gases thus condensed or adsorbed onto the pumping surfaces, only a vacuum remains in the work chamber.

In systems cooled by closed cycle coolers, the cooler is typically a two stage refrigerator having a cold finger which extends through the radiation shield. The cold end of the second, colder stage of the refrigerator is at the tip of the cold finger. The primary cryopumping array, or cryopanel, is connected to a heat sink at the coldest end of the second stage of the cold finger. This cryopanel may be a simple metal plate, a cup or a cylindrical array of metal baffles arranged around and connected to the second stage heat sink as, for example, in U.S. Pat. No. 4,494,381, which is incorporated herein by reference. This second stage cryopanel may also support low temperature condensing gas adsorbents such as charcoal or zeolite as previously stated.

The refrigerator cold finger may extend through the base of a cup-like radiation shield and be concentric with the shield. In other systems, the cold finger extends through the side of the radiation shield. Such a configuration at times better fits the space available for placement of the cryopump.

The radiation shield is connected to a heat sink, or heat station, at the coldest end of the cold first stage of the refrigerator. This shield surrounds the colder second stage cryopanel in such a way as to protect it from radiant heat. The frontal array that closes the radiation shield is cooled by the cold first stage heat sink through the shield or through thermal struts, as disclosed in U.S. Pat. No. 4,356,701, which is incorporated herein by reference.

Cryopumps need to be regenerated from time to time after large amounts of gas have been collected. Regeneration is a process wherein gases previously captured by the cryopump are released. Regeneration is usually accomplished by allowing the cryopump to return to ambient temperature and the gases are then removed from the cryopump by means of a secondary pump. Following this release and removal of gas, the cryopump is turned back on and after re-cooling is again capable of removing large amounts of gas from a work chamber.

The practice of the prior art has been to protect the adsorbent material placed on the second stage cryopanel, e.g. by enclosing the second stage adsorbent with chevrons, to prevent condensing gases from condensing on and hence blocking the adsorbent layer. In this manner, the layer is saved for the adsorption of noncondensing gases such as hydrogen, neon, or helium. This reduces the frequency of regeneration cycles. The chevrons, however, decrease the accessibility of the non-condensables to the adsorbent.

A figure of merit of cryopumps is the capture probability of hydrogen, the probability that a molecule of hydrogen that reaches the open mouth of the cryopump from outside of the pump will be captured on the second stage of the array. The capture probability directly relates to the speed of the pump for hydrogen, the liters per second captured by the pump. Higher rate pumps of conventional design have a capture probability of hydrogen of 20% or greater.

Various pump designs have been proposed to increase the pumping speed of Type III gases. For example, U.S. Pat. No. 7,313,922, which is incorporated herein by reference, presents a second stage array designed to increase the speed for pumping the non-condensable gases. It accomplishes this by opening up the second stage cryopanel to allow greater accessibility of the noncondensing gases, such as hydrogen, neon, or helium, to the adsorbent material placed on the interior surfaces of the discs of the cryopanel. This allows the noncondensing gases to be adsorbed more quickly, thus increasing the pumping speed for the non-condensables. The second stage arrays disclosed in that patent include radially extending baffles that are flat at their outer edges to be more open to hydrogen flow. That second stage cryopanel array has a diameter which is substantially less than that of the radiation shield. In one embodiment, the diameter of the array is 134 mm, while the diameter of the radiation shield is 304 mm. As a result, there is a large open volume between the two which provides for high conductance of gases to the second stage cryopanel even as Type I gases collect on the surface of the radiation shield. In general, it is preferred that the second stage cryopanel have a diameter less than 60% of the diameter of the radiation shield for a frontally projected cross-sectional area of less than 36% of the area of the frontal opening of the radiation shield.

Gas molecules in low pressure environments travel along straight paths and, with open space between the first and second stage cryopanels and the radiation shield, a significant amount of gas can be expected to reach the closed base of the radiation shield. Type I gases are there condensed. Type II and III gases are re-emitted from the surface in a direction according to the cosine law. In the illustrated embodiment of U.S. Pat. No. 7,313,922, the closed base was curved in order to focus noncondensed gases toward the second stage cryopanel. Thus, Type I gases are expected to be condensed, but Type II and Type III gases are directed toward the second stage cryopanel for condensation or adsorption on the second stage.

The discussion above is merely provided for general background information and is not intended to be used as an aid in determining the scope of the claimed subject matter. The claimed subject matter is not limited to implementations that solve any or all disadvantages noted in the background.

SUMMARY

Improved cryopump shielding with high capture rate and low radiation loading on the second stage array may be obtained with the disclosed second stage array configuration. In a cryopump, a cryogenic refrigerator comprises a cold (e.g. first) stage and a colder (e.g. second) stage. A radiation shield having sides, a closed end and a frontal opening opposite to the closed end is thermally coupled to and cooled by the cold stage. A primary cryopumping array thermally coupled to and cooled by the colder stage supports adsorbent material. A frontal array thermally coupled to the cold stage is spaced from and wrapped around the frontally facing envelope of the primary cryopumping array. As such, the frontal array may be in the path of radiation from the frontal opening to the primary cryopumping array for a radiation load on the primary cryopumping array of less than 4%.

The frontal array may be recessed from the frontal opening and closer to the primary cryopumping array than to the frontal opening.

For high gas conductance, the primary cryopumping array has a cross-sectional area substantially less than that of the frontal opening. To facilitate the frontal array being wrapped around the primary cryopumping array, the primary cryopumping array may have a frontally facing envelope that is closer to the radiation shield frontal opening towards a center than at its perimeter, and the frontal array may have a frontally facing envelope that is closer to the radiation shield frontal opening at its center than at its perimeter. For example, the frontally facing envelope of each of the primary cryopumping array and the frontal array may be domed. The frontal array may be thermally coupled to the cold stage through a thermal path substantially independent of the radiation shield. For example, the frontal array may be coupled to the cold stage through a cylinder surrounding the colder stage.

The frontal array may be positioned below the frontal opening area by at least 20% of full length of the radiation shield. The frontal array may be positioned with the top surface in a range of 50 mm to 100 mm below the frontal opening. The frontal array may be spaced less than 25 mm from the primary cryopumping array.

For high gas conductance, the cross-sectional area of the primary cryopumping array may have a frontally projected cross-sectional area less than 50% of the area of the frontal opening. The frontal array may have a frontally projected cross-sectional area less than 60% of the area of the frontal opening and greater than the cross-sectional area of the primary cryopumping array.

The frontal array may comprise annular louvers. The louvers toward the center of the frontal array may be greater in width than those toward the perimeter.

Both the closed end of the radiation shield and a distal envelope of the primary cryopumping array may be domed to minimize radiation loading of the second stage while focusing gas conductance to the second stage array.

The array configuration allows for capture probability of hydrogen of at least 20%. The radiation load may be less than 3%, preferably less than 2%, and more preferably below 1%.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

As discussed above, Cryopump shielding for the purpose of protecting the second stage array from unwanted radiation and gaseous contamination is very important to any cryopump design. With most cryopump designs a planar frontal array is used to block radiation to the second stage array while permitting gas molecules to the array. This design has been used for many years with success but with less than optimal shielding and transmission characteristics. Thermal conductance through the radiation shield to the frontal array was also a compromise. Baffle "rings" were added or subtracted to limit or increase conduction, with a corresponding effect on radiation load on the second stage array.

Figure 1:
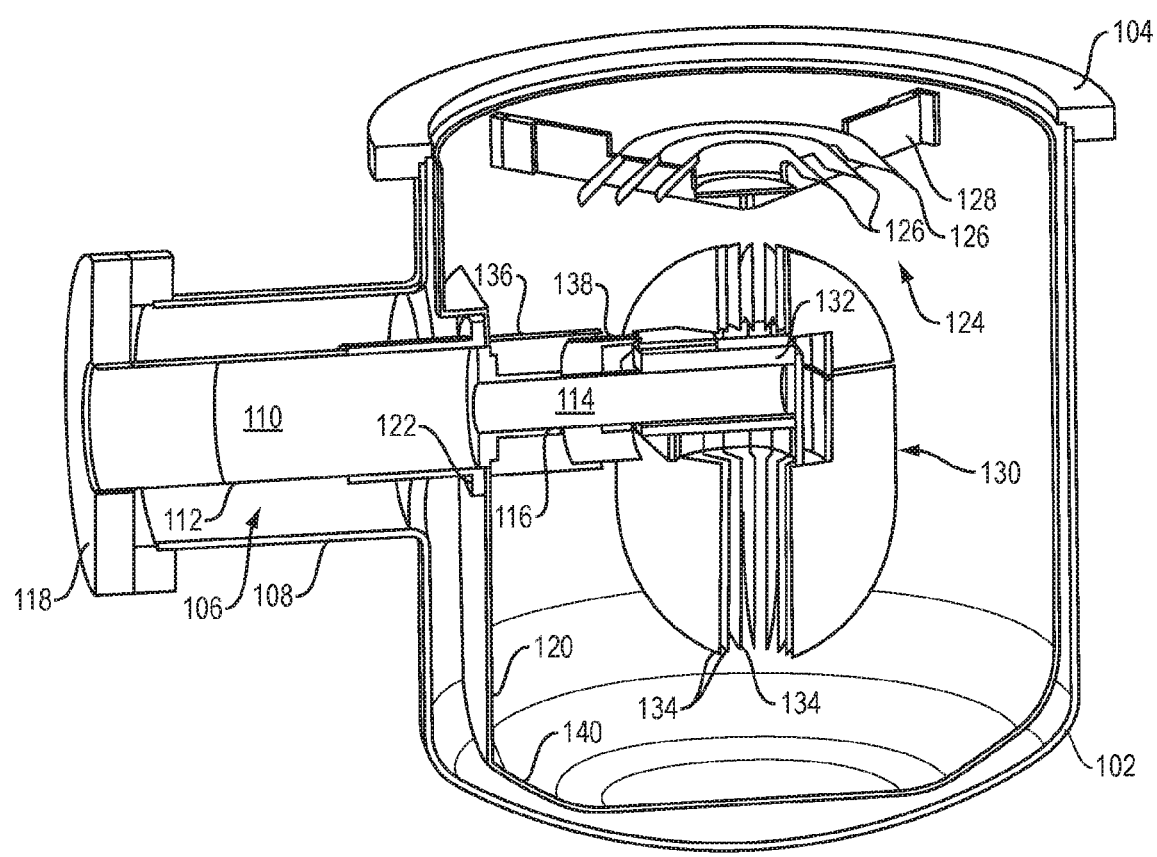
FIG. 1 is a cross-sectional perspective view illustrating a prior art cryopump.

FIG. 1 illustrates a prior art cryopump positioned in a vacuum vessel 102. The vacuum vessel is at ambient temperature and is mounted to a process chamber, typically through a gate valve, by means of a flange 104. Components of the cryopump within the vacuum vessel 102 are cooled by a two-stage cryogenic refrigerator 106. The refrigerator includes a cold finger having a first stage displacer 110 and a second stage displacer 114 that reciprocate within cylinders 112 and 116 of the cold finger. The cold finger is mounted to a drive motor through a flange 118 and extends through a side port 108 of the vacuum vessel 102.

The radiation shield 120 positioned within the vacuum vessel is cooled by the cold first stage 112 of the refrigerator through a first stage heat sink 122 at about 65K. A frontal array 124 is formed of louvers 126 that am supported on and cooled through the radiation shield by struts 128 to about 80K.

A primary cryopumping array 130 is mounted to a heat sink 132 of the colder second stage 116 of the cryogenic cold finger. Many configurations of second stage arrays are known and acceptable for use with the present invention, but in this case the second stage cryopumping array comprises a plurality of flat radially extending baffles 134. The baffles are coated with adsorbent material to capture type III gases. They are thermally coupled to the heat station 132 of the colder second stage of the refrigeration for cooling to about 13K.

The design of the frontal array is a balance of design goals. A more open frontal array allows more gas to flow into the volume within the radiation shield to be captured, resulting in higher capture rate. For example, the open design allows hydrogen to more readily pass into the volume for a higher capture rate of hydrogen, a critical design criteria in many applications. On the other hand, a more open design allows more radiation to pass directly to the second stage array and thus presents an undesirable radiation load on the second stage array. Radiation load of the second stage is the percentage of radiation received at the frontal opening of the array that directly impinges on the second stage array. With a more closed design, radiation is more likely to be blocked by the frontal array or be limited to line of sight paths to the radiation shield 120, decreasing second stage radiation load. However, gases that are intended to be condensed on or adsorbed on the second stage array are more likely to first strike the louvers 126 of the frontal array. In a high vacuum environment, such gases are then likely to be emitted back toward the process chamber.

The frontal arrays of U.S. Pat. No. 7,313,922 and in FIG. 1 are open for higher capture probability of hydrogen but have a resultant increase in radiation load to the second stage.

Radiation load is also a close approximation of the percentage of contaminant, such as photoresist from the process chamber, that sticks to the second stage array after being received at the frontal opening of the radiation shield. Such contaminants travel in a straight line in the high vacuum environment and stick to a first contacted surface.

The design change presented here is easily utilized as a modification to many conventional cryopump designs. The frontal array is not located at the inlet of the pump, that is, at the frontal opening of the radiation shield, like in most cryopumps, but is located deeper inside the pump where it provides better shielding and tailored performance. The frontal array can be shaped to mimic the second stage array shape and be sized to better shield the second stage array from unwanted gases and radiation while improving Type II and III gas conductance to the second stage array. This design allows for a shorter thermal path from the first stage heat station to the frontal array for improved thermal conductance and reduced temperature for improved vacuum performance. This design is tailored to be open to gas molecules but isolates the second stage from contamination and radiation load.

Figure 2:
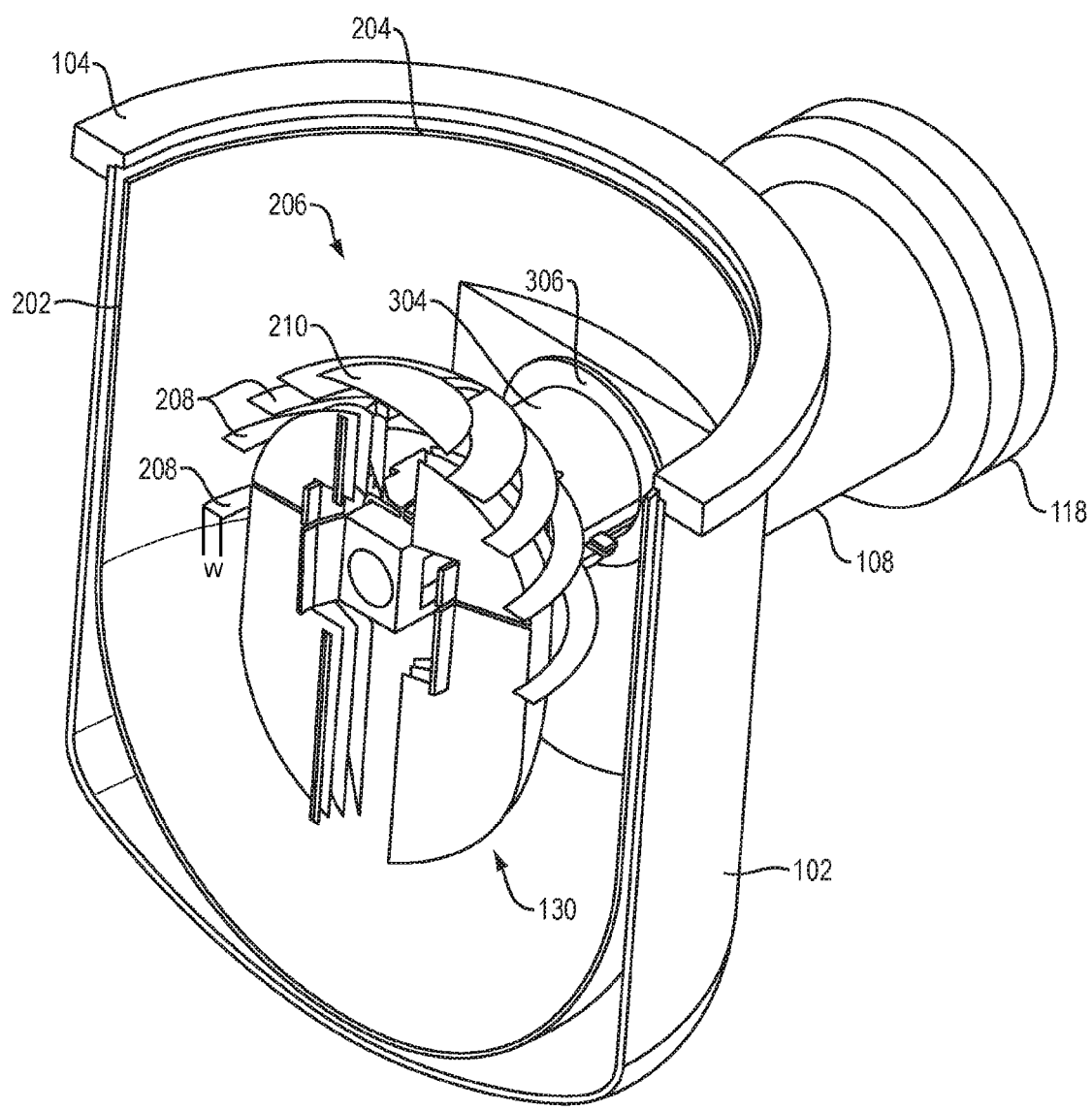
FIG. 2 is a cross-sectional perspective view of a cryopump embodying the present invention.

FIG. 2 illustrates a cryopump illustrating aspects of the present invention. The vacuum vessel 102, 108 and mounting flanges 104 and 118 are as in the prior art design of FIG. 1. The radiation shield 202 could be the same as the radiation shield 120 of the prior art design, but here the distal end is more dome shaped. The dome shape provides for more focusing of Type II and III molecules re-emitted from the radiation shield toward the second stage cryopumping array 130 according to the cosine law. The additional refocusing is particularly advantageous in the present design where the frontal opening 204 of the radiation shield is completely unobstructed by a frontal array. The result is that much more gas, as well as radiation, enters through the frontal opening towards the radiation shield, including its closed end.

Rather than having an inlet frontal array as in the conventional cryopump of FIG. 1, the present frontal array is set inside the radiation shield close to the second, colder stage cryopumping array 130. The frontal array 206 is shaped to correspond to the shape of the frontally directed envelope of the second stage array and wraps around the frontally directed end of the second stage array. The frontal array 206 is preferably formed of louvers 208 that are directly cooled from the first, cold stage of the cold finger, as will be described below, rather than through the radiation shield as in the prior art. In this embodiment, the frontal array 206 is dome shaped to correspond to the dome shape of the frontally directed envelope of the second stage array. The louvers in this embodiment include a wide center louver 210 and successive louvers 208 of increasing diameter but decreasing width W. The louvers could be of one width W but that would increase cost and impede molecular flow for the same radiation load. In this embodiment, the louvers 208 are flat rings, but they can be of different shapes, size and number as will be described.

With the louvers 208 and 210 of the frontal array 206 positioned close to the second stage array, they are able to more efficiently block radiation that passes through the frontal opening 204 toward the second stage array. On the other hand, the louvers leave wide spaces facing radially toward the radiation shield so that gas molecules that freely enter the frontal opening 204 and strike the inner surface of the radiation shield are re-emitted, generally radially according to the cosine function, toward the second stage cryopumping array. Thus, the configuration is very open to capture of gas molecules while substantially reducing the radiation load on the second stage array.

In this and other embodiments, it is preferred that the frontal array 206 be spaced at least 20% of the full length of the radiation shield below the frontal opening 204, for example, 50 mm to 100 mm. It is preferably no more than 25 mm from the second stage array. For hydrogen capture rate of at least 20%, it is best that the frontally projected cross-sectional area of the primary, second stage cryopumping array be less than 50% of the area of the frontal opening and that frontally projected area of the frontal array be less than 60% of the frontal opening area. With the frontal array wrapped around the second stage array, in the path of substantially all straight lines from the frontal opening to the second stage array, radiation load of less than 4% and even less than 1% can be obtained.

Figure 3:
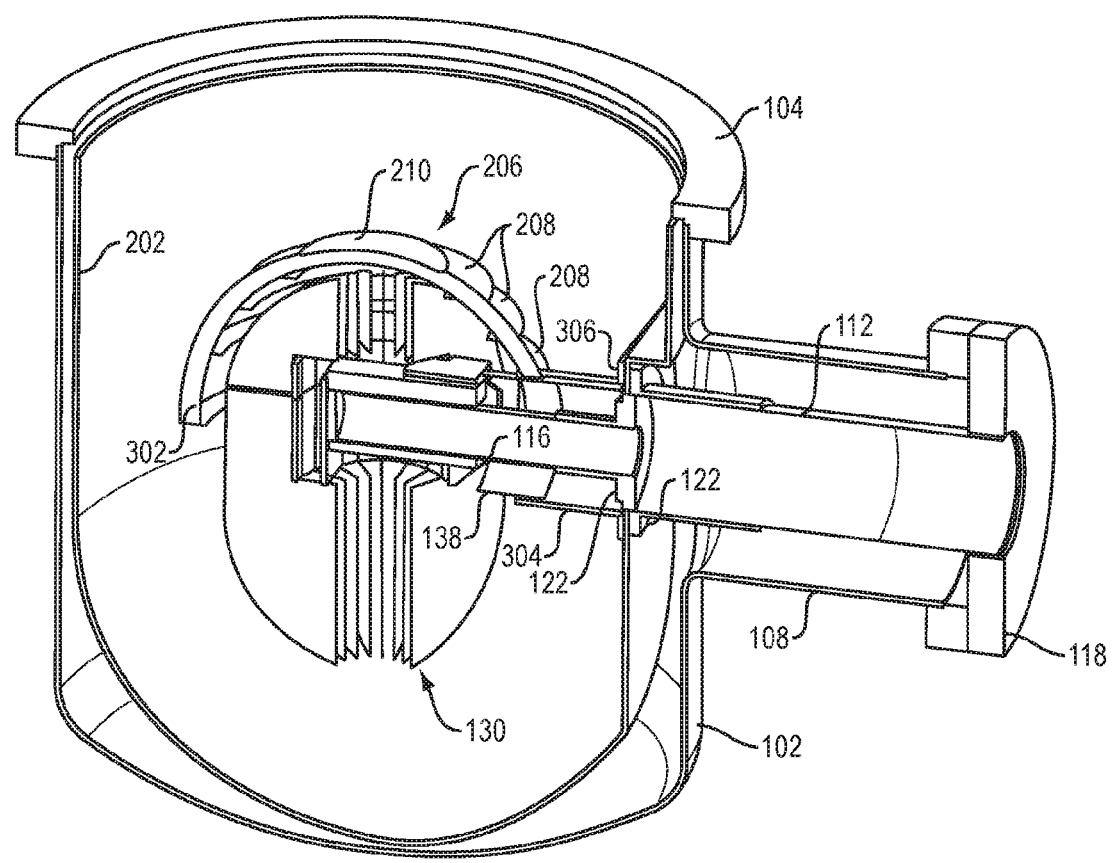
FIG. 3 is a cross-sectional perspective view of the cryopump of FIG. 2 from a different angle.

FIG. 3 illustrates the embodiment of FIG. 2 but from a different view to illustrate the thermal coupling of the first stage frontal array 206 to the first stage heat sink 122 of the refrigerator cold finger. The louvers 210 and 208 of the frontal array are supported on and thermally coupled to a thermally conducting strut 302 that is coupled to a modified shield cylinder 304 extending from the heat sink 122 of the first stage cold finger. The shield 304 is modified with respect to the shield 136 of FIG. 1 in that it is of thicker material for greater conductivity to support heat flow to the frontal array 206. It is mounted to the heat sink 122 through a flange 306.

Figure 4:
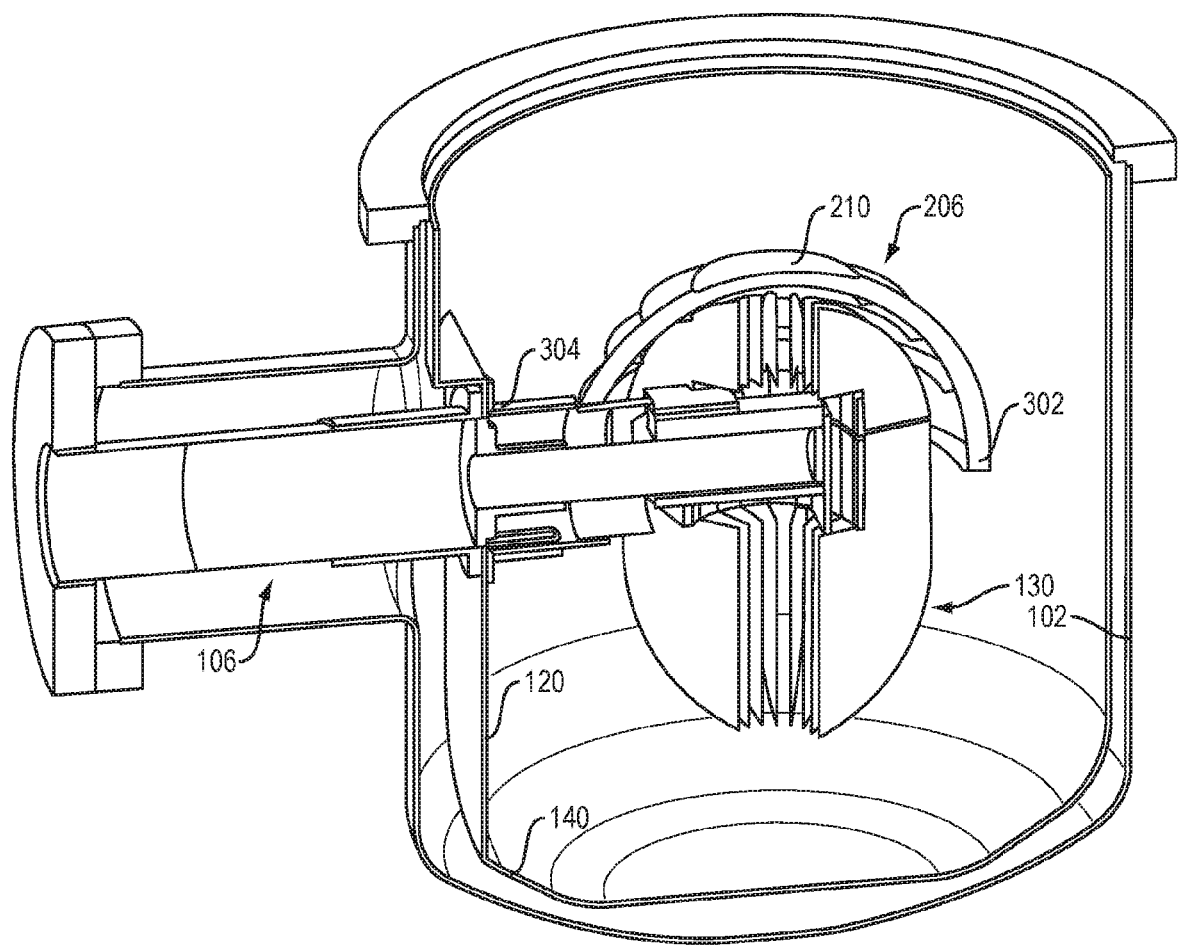
FIG. 4 is a cross-sectional perspective view of another embodiment of a cryopump embodying the present invention

FIG. 4 illustrates another embodiment that is substantially the same as that of FIG. 3 except that the radiation shield used in the prior art of FIG. 1 is used. It also shows a cross-sectional view of the system from an opposite side.

Figure 5:
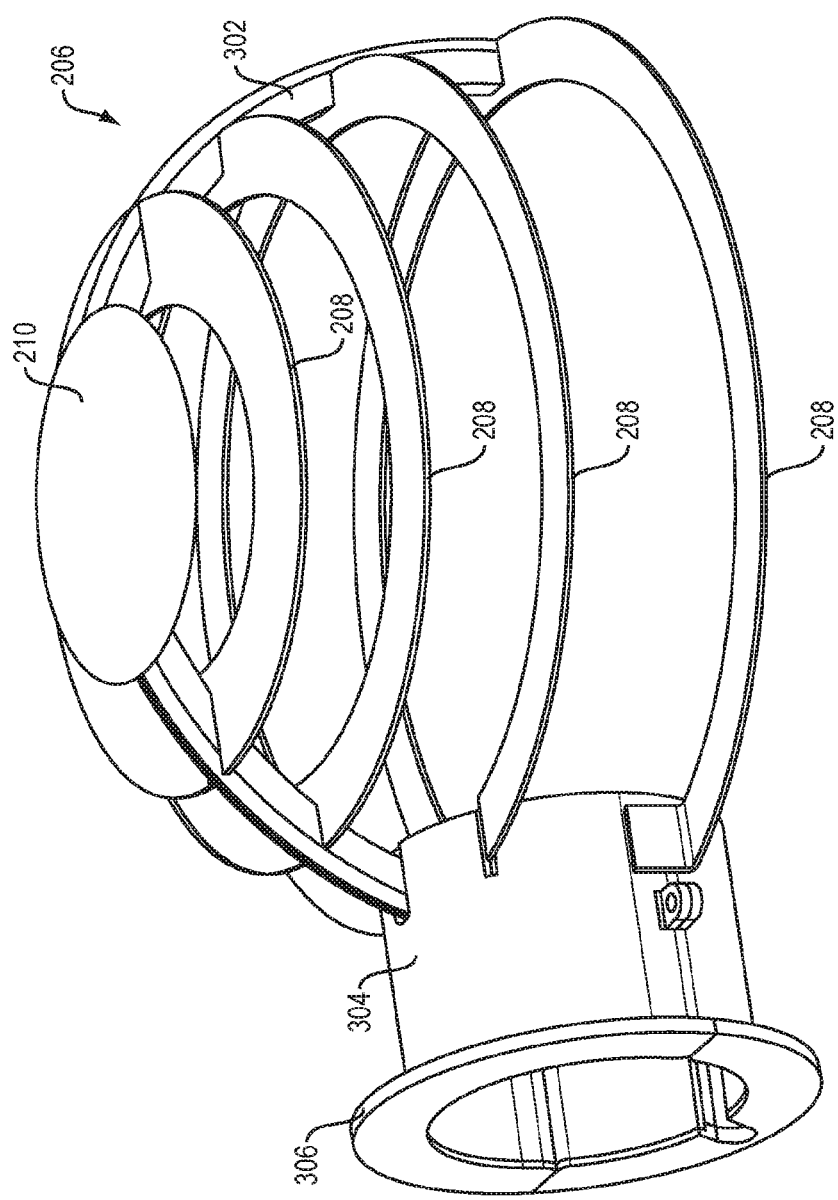
FIG. 5 is an enlarged perspective view of a frontal array used in each of the embodiments of FIGS. 2-4.

FIG. 5 is a more detailed illustration of the frontal array of FIGS. 3 and 4. It can be seen that the two larger diameter louvers 208 are also directly coupled to the first stage heat sink through the second stage shield 304. Also illustrated is a flange 306 by which the shield 304 is coupled to the heat station 122 of the first stage of the refrigerator cold finger.

Figure 6:
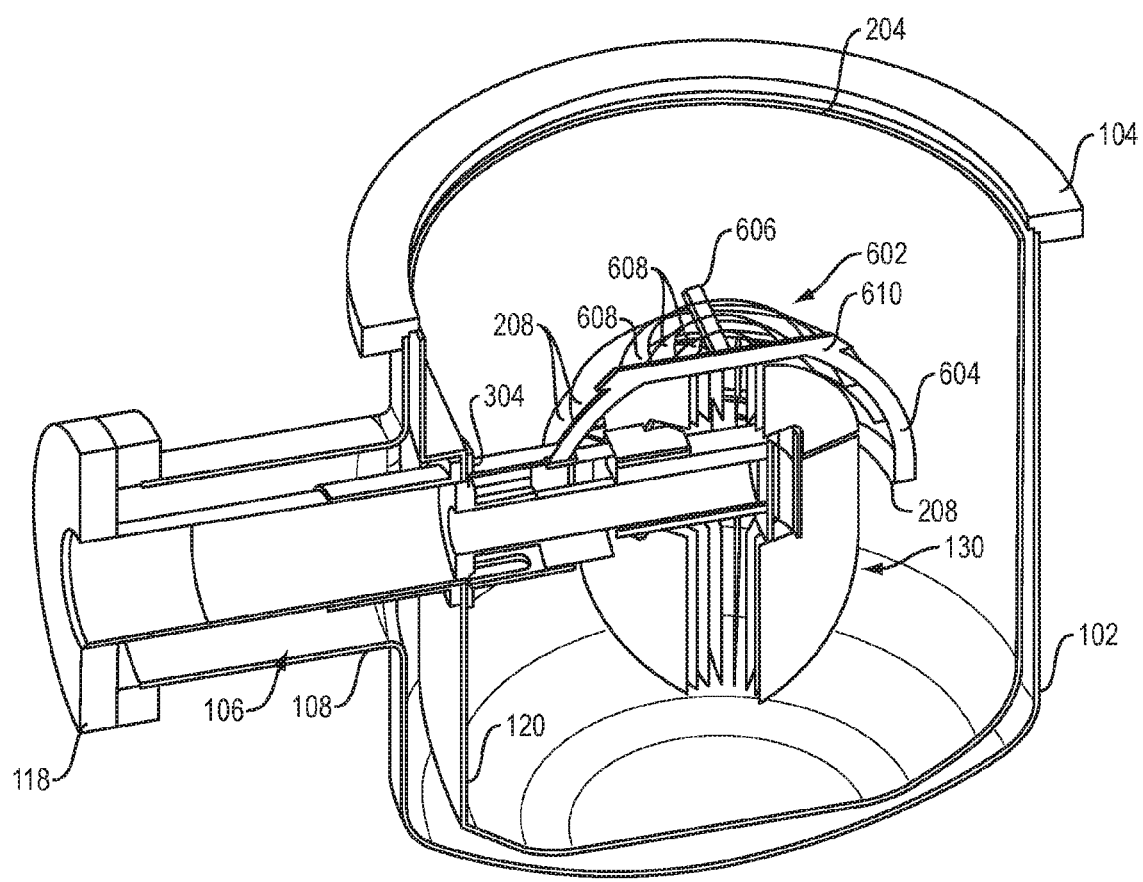
FIG. 6 is a cross-sectional perspective view of yet another embodiment of the invention.

FIG. 6 illustrates an alternative embodiment. In this embodiment, the conventional radiation shield 120 is used. A different configuration of louvers is provided. In this embodiment, the center louver 210 and uppermost ring louver 208 are replaced by a set of louvers more similar to those of a conventional frontal array. Three louvers 608 are mounted to a modified strut 604 and to an additional strut 606. The louvers 608 are angled and are of different diameters along a plane. However, as distinguished from the conventional frontal array, these louvers 608 are positioned close to the frontally projecting envelope of the second stage array 130, preferably within 25 mm, and are set well below the frontal opening 204 of the radiation shield, preferably by 50-100 mm. They are also supplemented by louvers 208 similar to the three lowest louvers 208 of FIG. 2 so that the frontal array wraps around the second stage array.

Figure 7:
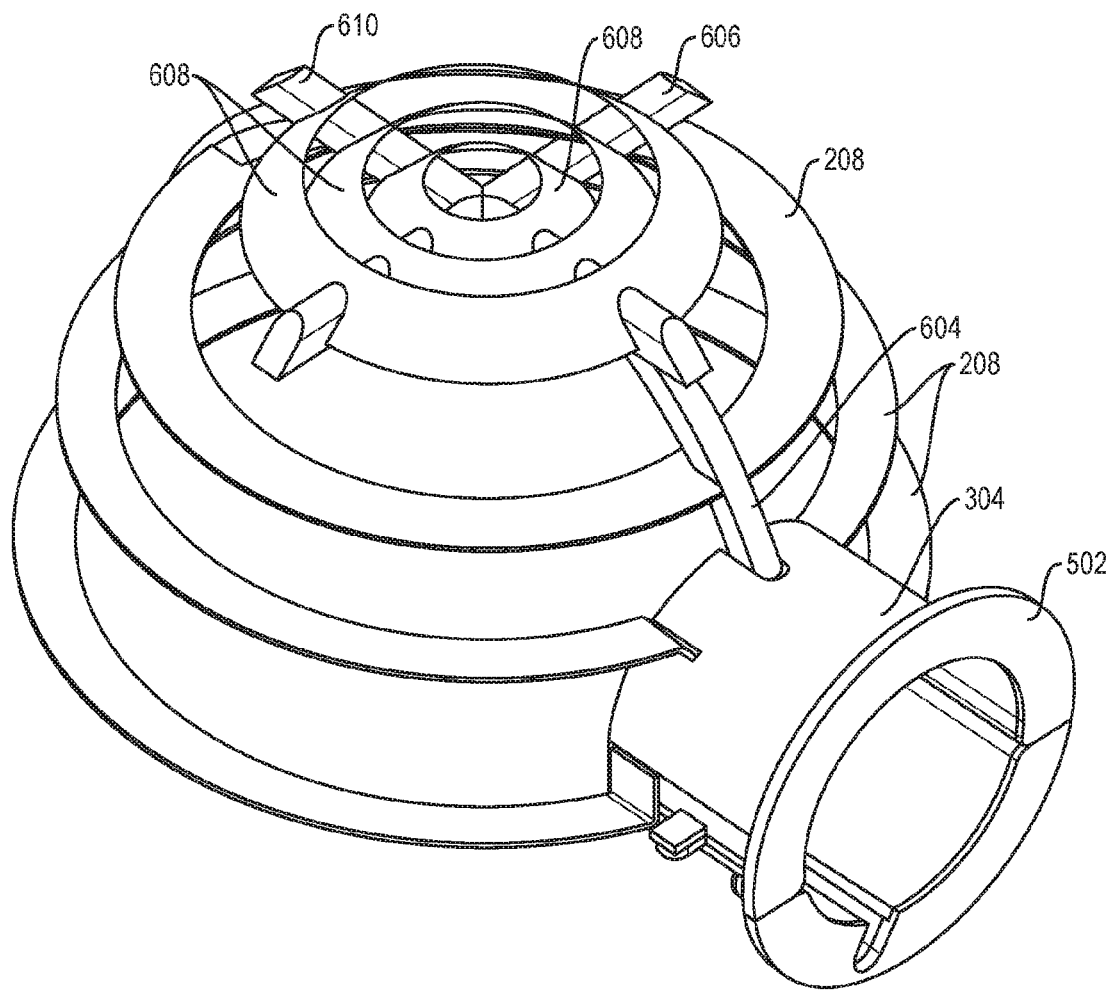
FIG. 7 is an enlarged perspective view of the frontal array used in the embodiment of FIG. 6.

FIG. 7 illustrates the frontal array of FIG. 6 in greater detail. The strut 604 includes a straight top section 610 to support the three louvers 608.

Figure 8:
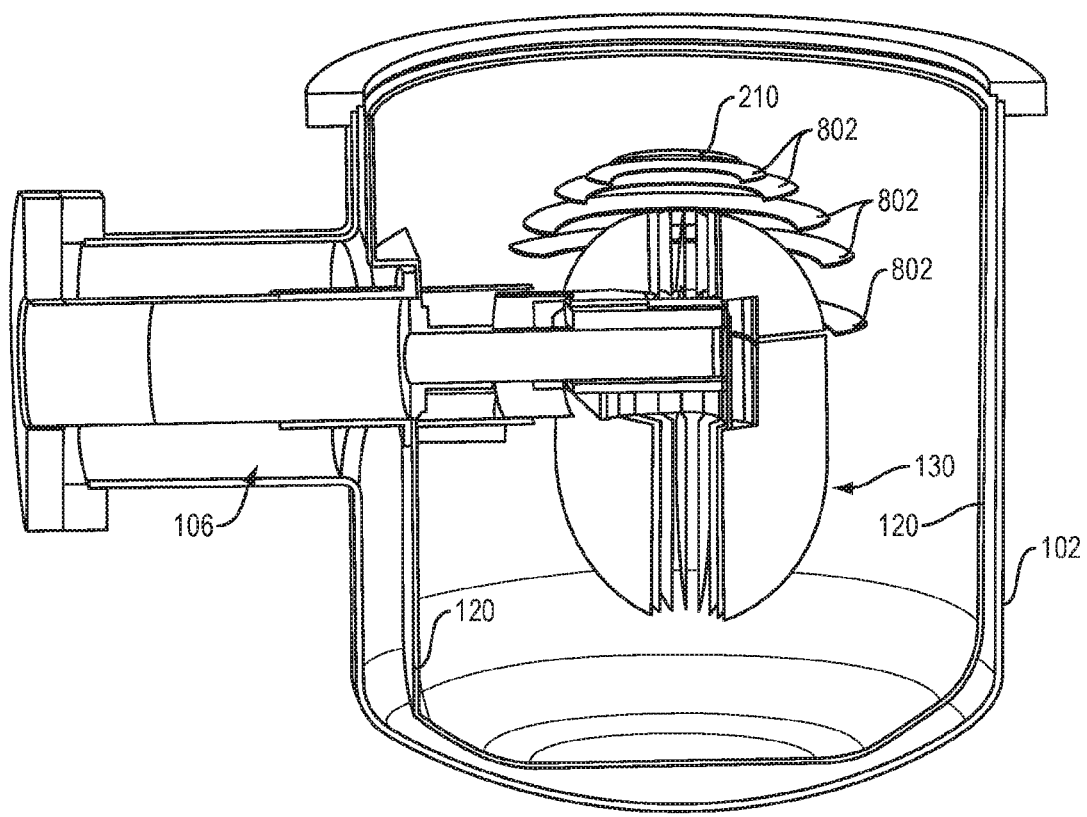
FIG. 8 is a cross-sectional perspective view of yet another embodiment of the invention.

FIG. 8 illustrates another embodiment of the frontal array. As in FIG. 2, there is a center louver 210 surrounded by additional ring louvers of increasing diameter. However, in this embodiment, five rings are provided and each ring has an upward curve from the inner diameter to the outer diameter of the ring. This design of the louvers may result in greater gas conduction toward the second stage array.

Figure 9:
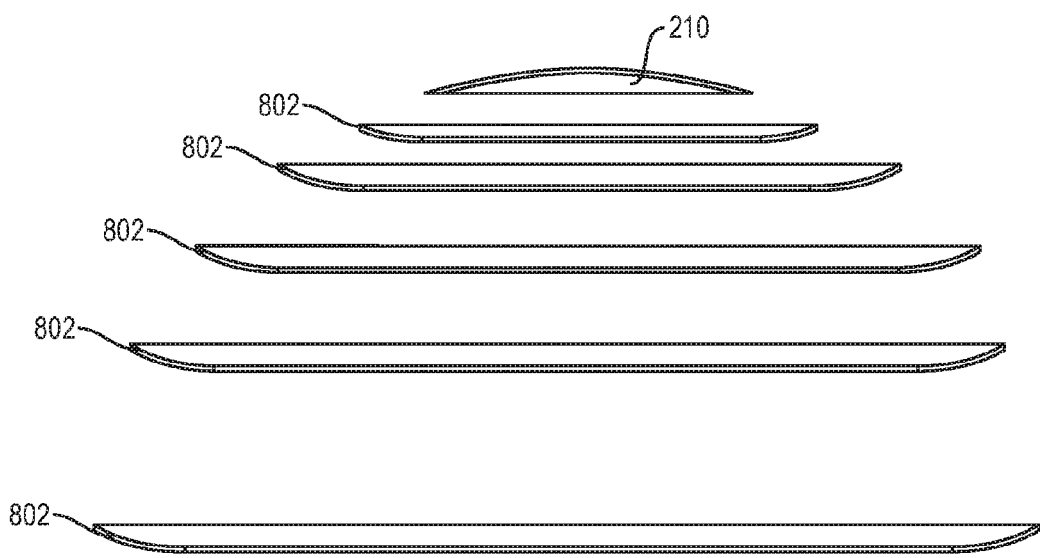
FIG. 9 is an enlarged side cross-sectional view of the frontal array of FIG. 8.

FIG. 9 illustrates the louvers of FIG. 8 in cross-section. The struts that support the louvers are not illustrated in FIGS. 8 and 9.

Figure 10:
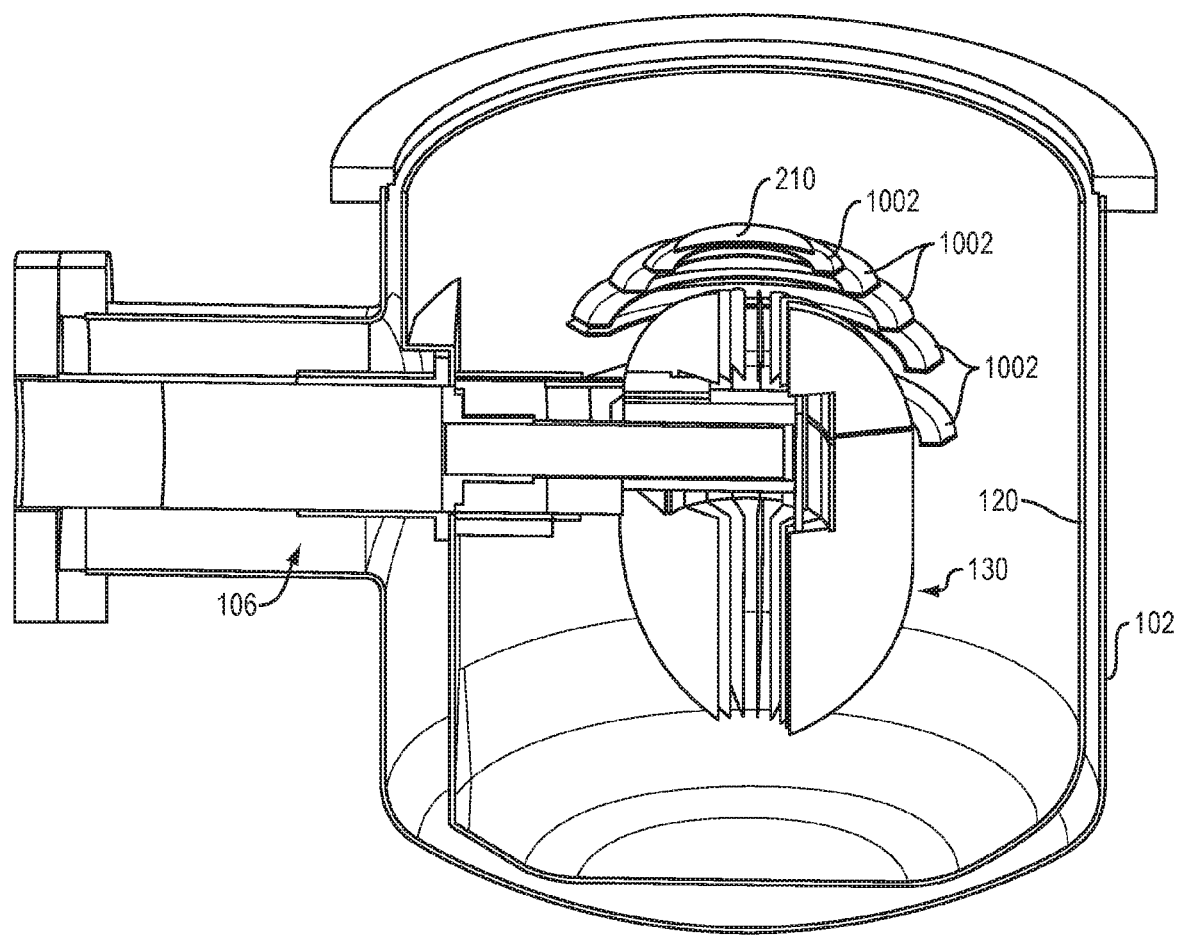
FIG. 10 is a cross-sectional perspective view of yet another embodiment of the invention.
Figure 11:
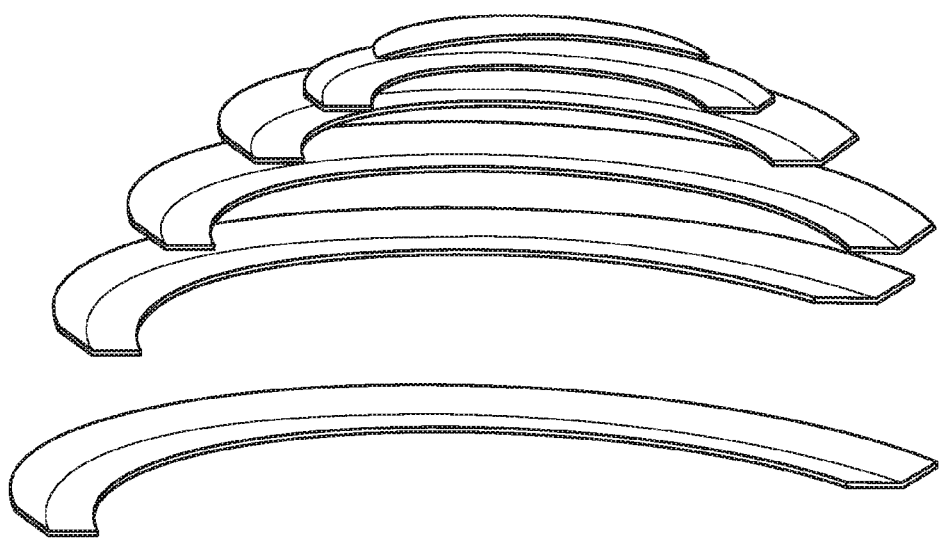
FIG. 11 is an enlarged cross-sectional perspective view of the frontal array of FIG. 10.

FIG. 10 illustrates yet another embodiment in which the louvers are plates that are bent upwardly near the peripheral edges. These louvers 1002 are shown in greater detail in FIG. 11. In each of FIGS. 10 and 11, the supporting struts are not shown.

Calculated radiation loads less than 2% (1.74%) to the second stage array are less than half of the existing planar array at (4.2%) with comparable calculated gas speeds (e.g. higher capture probability of hydrogen). The array sits deeper and surrounds the second stage array with better thermal and first strike gas protection for increased vacuum performance.

In a conventional cryopump design, the second stage array is shielded by an inlet mounted planar radiation baffle across the frontal opening. With the present design, the second stage array is now shielded with a frontal radiation baffle array that is lower inside the pump, limiting the tradeoff of speed vs. second stage radiation load. This enhancement also mounts the inlet baffle directly to the first stage heat station via a gas shield about the second stage cylinder, thus producing a colder frontal array and better vacuum performance. Heat load simulation shows the frontal array to be much colder, less than 70K, than the conventional design, about 80K.

This design is also compatible with in situ second stage cryopump placement inside a vacuum chamber. Conventionally a "radiation shield" and inlet baffle would be used to limit second stage radiation but inhibit gas pumping on the second stage. Consequently the "radiation shield" would limit gas conduction around the second stage array, limiting speed; this limitation would not be present in this design. The small footprint and "tailored" design is ideal for these types of applications.

The proposed design is fit to the second stage array to limit radiation but allows better gas conduction to the array. This "tailored" approach is less costly, operates at a lower temperature and eliminates bulky parts associated with conventional arrays.

The design concept is suitable for next generation implant applications for lower heat loading and less second stage charcoal contamination while allowing gas conduction. This design concept could also be utilized in existing cryopumps to limit radiation and gaseous contamination while allowing increased gas conduction.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

Although the present invention has been described with reference to preferred embodiments, workers skilled in the art will recognize that changes may be made in form and detail without departing from the spirit and scope of the invention.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A cryopump comprising:
    a cryogenic refrigerator comprising a cold stage and a colder stage;
    a radiation shield having sides, a closed end, and a frontal opening opposite to the closed end, the radiation shield being thermally coupled to and cooled by the cold stage;
    a primary cryopumping array thermally coupled to and cooled by the colder stage, the primary cryopumping array supporting adsorbent material; and
    a frontal array thermally coupled to the cold stage, wherein the frontal array is spaced from and wrapped around a frontally facing envelope of the primary cryopumping array to be in the path of radiation from the frontal opening to the primary cryopumping array for a radiation load on the primary cryopumping array of less than 4%, the frontal array being recessed from the frontal opening and closer to the primary cryopumping array than to the frontal opening.

2. The cryopump as claimed in claim 1 wherein the frontal array is positioned below the frontal opening area by at least 20% of full length of the radiation shield.

3. The cryopump as claimed in claim 1 wherein the frontal array is positioned with a top surface in the range of 50 mm to 100 mm below the frontal opening of the radiation shield.

4. The cryopump as claimed in claim 1 wherein the frontal array is spaced less than 25 mm from the primary cryopumping array.

5. The cryopump as claimed in claim 1 wherein the cross-sectional area of the primary cryopumping array has a frontally projected cross-sectional area less than 50% of the area of the frontal opening.

6. The cryopump as claimed in claim 1 wherein the frontal array has a frontally projected cross-sectional area less than 60% of the area of the frontal opening and greater than the cross-sectional area of the primary cryopumping array.

7. The cryopump as claimed in claim 1 wherein the frontally facing envelope of the primary cryopumping array is domed and the frontally facing envelope of the frontal array is domed.

8. The cryopump as claimed in claim 1 wherein the frontal array comprises annular louvers.

9. The cryopump as claimed in claim 8 wherein the louvers toward the center of the frontal array are of greater width than those toward the perimeter.

10. The cryopump as claimed in claim 1 wherein the frontal array is coupled to the cold stage through a cylinder surrounding the colder stage.

11. The cryopump as claimed in claim 1 wherein the radiation shield is domed at its closed end and the primary cryopumping array has a distal envelope that is domed.

12. The cryopump as claimed in claim 1 having at least a 20% capture probability of hydrogen.

13. The cryopump as claimed in claim 1 wherein the radiation load to the primary cryopumping array is less than 3%.

14. The cryopump as claimed in claim 1 wherein the radiation load to the primary cryopumping array is less than 2%.

15. A cryopump comprising:
- a cryogenic refrigerator comprising a cold stage and a colder stage;
- a radiation shield having sides, a closed end, and a frontal opening opposite to the closed end, the radiation shield being thermally coupled to and cooled by the cold stage;
- a primary cryopumping array thermally coupled to and cooled by the colder stage, the primary cryopumping array supporting adsorbent material and having a cross-sectional area less than that of the frontal opening, the primary cryopumping array having a frontally facing envelope that is closer to the radiation shield frontal opening toward its center than at its perimeter; and
- a frontal array thermally coupled to the cold stage through a thermal path independent of the radiation shield, the frontal array having a frontally facing envelope that is closer to the radiation shield frontal opening at its center than at its perimeter and spaced from and wrapped around the frontally facing envelope of the primary cryopumping array to be in the path of radiation from the frontal opening to the primary cryopumping array for a radiation load on the primary pumping array of less than 4%.

16. The cryopump as claimed in claim 15 wherein the frontal array is recessed from the frontal opening and closer to the primary cryopumping array than to the frontal opening.

17. The cryopump as claimed in claim 1 wherein the radiation load to the primary cryopumping array is less than 1%.

* * * * *